United States Patent [19]

Taguchi

[11] Patent Number: 4,712,708
[45] Date of Patent: Dec. 15, 1987

[54] CAP MOUNTING STRUCTURE OF THE GOVERNOR VALVE FOR AUTOMATIC TRANSMISSION

[75] Inventor: Hiromi Taguchi, Zama, Japan

[73] Assignee: Nissan Motor Co., Ltd., Yokohama, Japan

[21] Appl. No.: 849,714

[22] Filed: Apr. 9, 1986

[30] Foreign Application Priority Data

Apr. 17, 1985 [JP] Japan ............................... 60-57355[U]

[51] Int. Cl.4 ............................................. B65D 45/32
[52] U.S. Cl. ..................................... 220/319; 29/453; 29/526 R; 137/382; 220/324; 403/DIG. 7; 403/372
[58] Field of Search ............. 29/453, 526 R; 220/319, 220/323, 324, 322; 137/47, 48, 50, 382; 403/372, DIG. 7, 313

[56] References Cited

U.S. PATENT DOCUMENTS

| 684,384 | 10/1901 | Rowe | 220/322 |
| 2,789,364 | 4/1957 | Selleck | 403/DIG. 7 UX |
| 3,032,229 | 5/1962 | Schoepe et al. | 220/319 X |
| 4,004,684 | 1/1977 | Scollins | 220/324 X |
| 4,248,262 | 2/1981 | Iwanaga | 220/319 X |

FOREIGN PATENT DOCUMENTS 55-40202 3/1980 Japan .

Primary Examiner—Charlie T. Moon
Attorney, Agent, or Firm—Schwartz, Jeffery, Schwaab, Mack, Blumenthal & Evans

[57] ABSTRACT

An improved cap mounting structure of the governor valve for automatic transmission is shown. The cap is mantled on a governor case for housing the governor valve by a snap ring which engages the outer periphery of the governor case through openings formed on the cap at inner protruding portions and the both end of the snap ring.

5 Claims, 2 Drawing Figures

CAP MOUNTING STRUCTURE OF THE GOVERNOR VALVE FOR AUTOMATIC TRANSMISSION

BACKGROUND OF THE INVENTION

1. Field of the Invention

The present invention relates to a mounting structure of the cap that houses the governor valve that generates the governor oil pressure in the automatic transmission for a motor vehicle.

2. Description of Prior Art

As a prior example of the mounting device of the cap there may be mentioned the device as disclosed in Japanese Utility Model Published Application No. 55-40202. The cap mounting structure as described in the publication has a plurality of slits on the bottom edge portion of the cap, as well as a snap ring that has inwardly protruding portions that are inserted into the slits. After the case is covered with the cap, it is arranged that the inwardly protruding portions of the snap ring engage the case via the slits, by inserting the snap ring to the outer periphery of the cap.

However, with the structure noted above, the tips of the snap ring protrude to the exterior of the cap so that the snap ring will easily be opened, expanded and slipped out of place by inadvertent catching of the ring tips during maintenance, inspection, or the like. Namely, there is a problem that the cap is easily inadvertently removed.

The governor valve of the automatic transmission is a valve for generating a governor oil pressure which is proportional to the rotation speed of the output shaft of the transmission. If the cap is removed, the governor valve will tend to stick or malfunctions may occur that obstruct the accurate operation of the transmission control valve, due to intrusion of dust or the like that exist in the engine room. Therefore, it is desirable to make it difficult to dismantle the governor cap except for the case where proper disassembling can be ensured in a facility with servicing equipment and the like.

SUMMARY OF THE INVENTION

An object of the invention is to provide a cap mounting structure of the governor valve for automatic transmission without fear of fall-out from a governor cap.

Another object of the invention is to provide a cap mounting structure of the governor valve for an automatic transmission for preventing disassembly even when unintentionally acted on by an external pulling force.

A further object of the invention is to provide a cap mounting structure of the governor valve for an automatic transmission which resists removal through inadvertent contact by providing a snap ring holding the cap on a governor case.

DETAILED DESCRIPTION OF THE PREFERRED EMBODIMENT

Figure 1:
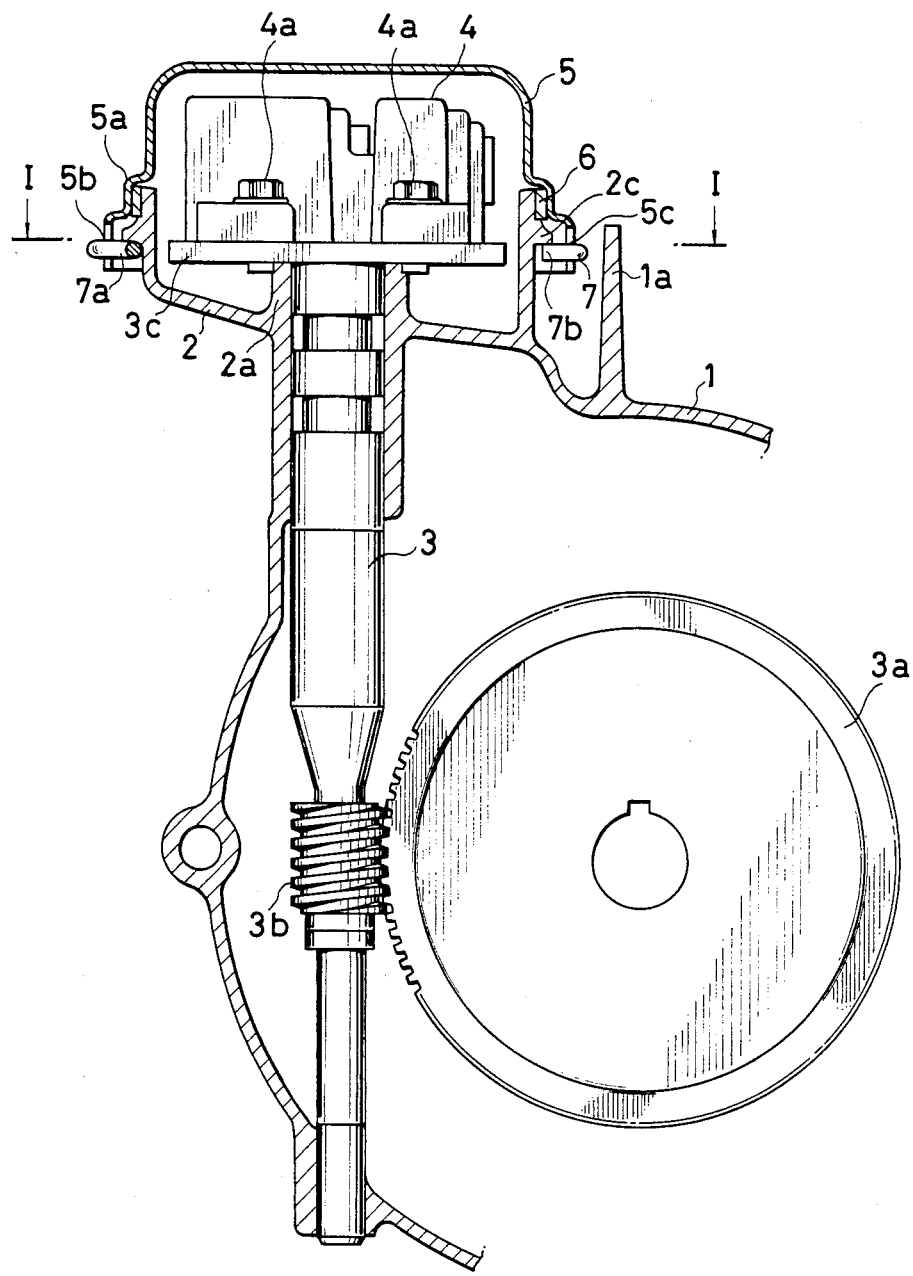
FIGS. 1 and 2 are a cross-sectional view and the I-I cross-sectional view, respectively, of an embodiment of the present invention.
Figure 2:
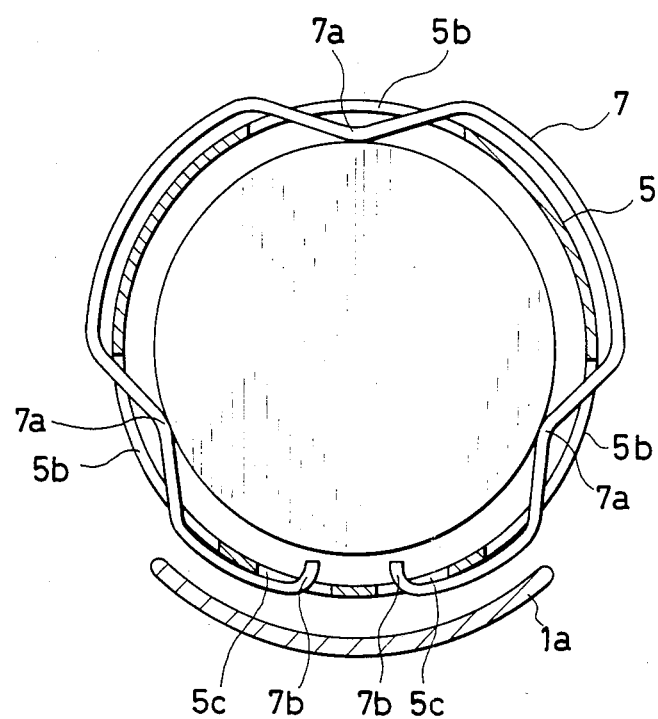

Referring to FIGS. 1 and 2, an embodiment of cap mounting structure of the governor valve for automatic transmission according to the present invention is shown.

In the Figures, reference numeral 1 designates the transmission case which has a cylindrically projected governor case 2 in one section of the case. On the outer periphery of the case 2 there is provided a collar-shaped flange 2c that is projected from the case, and in its interior there is provided a cylindrical guide 2a that supports freely rotatably a governor shaft that is driven by the output unit of the transmission via a worm 3a and a worm-wheel 3b.

The governor shaft 3 has at its top end a base plate 3c that is formed in a united body. On the base plate 3c there is fixed a governor valve body 4 by means of the bolts 4a.

Reference numeral 5 shows a governor cap which is formed in cup-shape made of resine member, for housing the governor valve body 4. The governor cap 5 has a stepped section with increased diameter 5a that fits the governor case 2 via an O ring 6. In addition, in its lower edge section it has slits 5b each having an appropriate length along the circumference, formed at the positions that trisect the circumference into equal parts. Further, between two of these slits 5b there are created two oblong apertures 5c that have predetermined length.

Reference numeral 7 shows a snap ring with approximate shape of letter C that has inwardly protruding portions 7a that project into the interior at the positions that trisect its circumference, corresponding to the slits on the cap 5. In addition, at its both ends there are formed bent end portions 7b that are bent toward the interior corresponding to the oblong apertures 5c on the cap 5.

Accordingly, after fitting the O ring 6 over the flange 2c of the governor case 2 and fitting the governor cap 5 to the governor case 2, the three inwardly protruding portions 7a are inserted into the slits 5b of the cap 5, under the state in which the bent end portions 7b of the snap ring 7 are held expanded and opened. Then, the bent end portions 7b are inserted respectively into the oblong apertures 5c. By so doing, the governor cap 5 is fixed so as to prevent the fall-off, by the engagement of the inwardly protruding portions 7a and the bent end portions 7b of the snap ring 7 to the lower surface of the flange 2c of the governor case 2.

In this case, the bent end portions 7b of the snap ring 7 are inserted into the oblong apertures 5c of the governor cap 5. Therefore, even when a force is applied to the snap ring 7 in the direction to withdraw directly the inwardly protruding portions 7a from the slits 5b the bent end portions 7b are engaged to the rim of the oblong apertures 5c and hence, it is possible to prevent the dismantling of the snap ring 7.

Furthermore, an attempt to withdraw the govenor cap 5 from the govenor case by the direct application of a large force, can also be prevented positively. This is because, not only the inwardly protruding portions 7a of the snap ring 7 but also its bent end portions 7b are engaged to the flange 2c of the governor case 2, and the increase in the diameter of the snap ring 7 is prevented by the engagement of the bent end portions 7b to the oblong apertures. Of course, the bent end portions 7b of the snap ring 7 are intruding into the interior of the governor cap 5 so that they will not unwittingly catch the operator during inspection or servicing, neither creating the possibility of injuring the operator nor causing the fall-off of the snap ring due to its expansion and opening.

Moreover, to prevent the fall-off of the snap ring, there may be formed a wall 1a projected from the transmission case 1, adjacent to the governor case 2 as shown in the Figure. By rotating the governor cap 5, after the snap ring 7 was mounted, to orient the bent end portions 7b to face the wall 1a projected from the case, it is possible to obtain a construction which is less easy for the snap ring 7 from falling off.

Although the description of assembling was given in the foregoing in conjunction with manual work, the assembling for the present embodiment may also be accomplished by automatic assemblage.

Namely, with the snap ring feeder extending up to the vicinity of the governor cap 5, by pulling it in the opposite directions and striding over the governor cap, the inwardly protruding portion 7a at the central part of the ring can be inserted into a slit 5b. Then, by aligning the inwardly protruding portions 7a on both side parts to the corresponding slits and by releasing the bent end portions 7b it is possible to insert the bent end portions 7b into the oblong apertures 5c, as well as to insert the inwardly protruding portions 7a on both sides into the corresponding slits 5b. In this manner automatic assembling can be accomplished.

Moreover, to remove the snap ring 7, use may be made of a tool that engages the spring portions of the snap ring 7 that is exposed, in the vicinity of the bent end portions 7b to the exterior of the cap, and engages also the spring portions on the opposite side (the portions that are exposed to the exterior of the cap). By expanding and opening both end portions, and increasing the diameter, of the snap ring 7, it is possible to dismantle the snap ring 7 off the cap 5 without any strain.

As described in the foregoing, according to the present invention, it becomes possible to give a construction for holding the cap which is easy to mount and is difficult to disassemble, by bending inwardly the ends of the snap ring for fixing the governor cap and by inserting the bent ends into the oblong apertures that are provided in the governor cap. This construction makes the snap ring difficult to be dropped off even when there is applied an external force on the ring, giving rise to a practical effect that the governor cap can be fixed firmly to the governor case.

Various modifications will become possible for those skilled in the art after receiving the teachings of the present disclosure without departing from the scope thereof.

What is claimed is:

1. A cap mounting structure for a transmission comprising:
   a casing provided in the transmission and having an outer flange formed in the periphery of the casing;
   cap means disposed on the casing and having a skirt section which downwardly extends beyond the outer flange and has a plurality of holes and a pair of openings located below the outer flange; and
   a snap ring means having a plurality of inwardly protruding portions each inwardly protruding into one of the holes, each end of the snap ring means being inwardly bent and inserted into one of said pair of openings of the skirt section of the cap means, said inwardly protruding portions of said snap ring and said ends of the snap ring means engaging with the skirt section of the cap means, and said ends of the snap ring means engaging with said outer flang of the casing to prevent the snap ring means from circumferentially rotating beyond a predetermined range.

2. A cap mounting structure as claimed in claim 8 wherein said cap mounting structure further comprises a projecting wall projecting outwardly from a second casing of the transmission and being positioned adjacent to said casing such that said pair of openings containing said bent ends of the snap ring means force the projecting wall.

3. A cap mounting structure for a transmission comprising:
   a casing provided in the transmission and having an outer flange formed in the periphery of the casing;
   a cap disposed on the casing and having a skirt section which downwardly extends beyond the outer flange and has a plurality of holes located therein below the outer flange;
   a snap ring surrounding substantially the entire circumference of said cap and having a plurality of radially inwardly protruding portions each inwardly protruding into one of the holes and engaging with the outer flange of said casing; and
   means, including a pair of essentially adjacent openings located in the skirt section of the cap below the outer flange and each end of the snap ring means radially inwardly bent and inserted into one of said pair of openings of the skirt section of the cap, for preventing an increase in diameter of said snap ring as long as said snap ring ends are engaged in said openings.

4. A cap mounting structure as claimed in claim 3, comprising at least three of said inwardly projecting portions of said snap ring positioned approximately equidistantly around said snap ring.

5. A cap mounting structure as claimed in claim 3, wherein said inwardly bent ends of said snap ring also engage with said outer flange.

* * * * *